(No Model.)
J. B. BUTLER.
ICE CREAM FREEZER.
No. 521,013. Patented June 5, 1894.
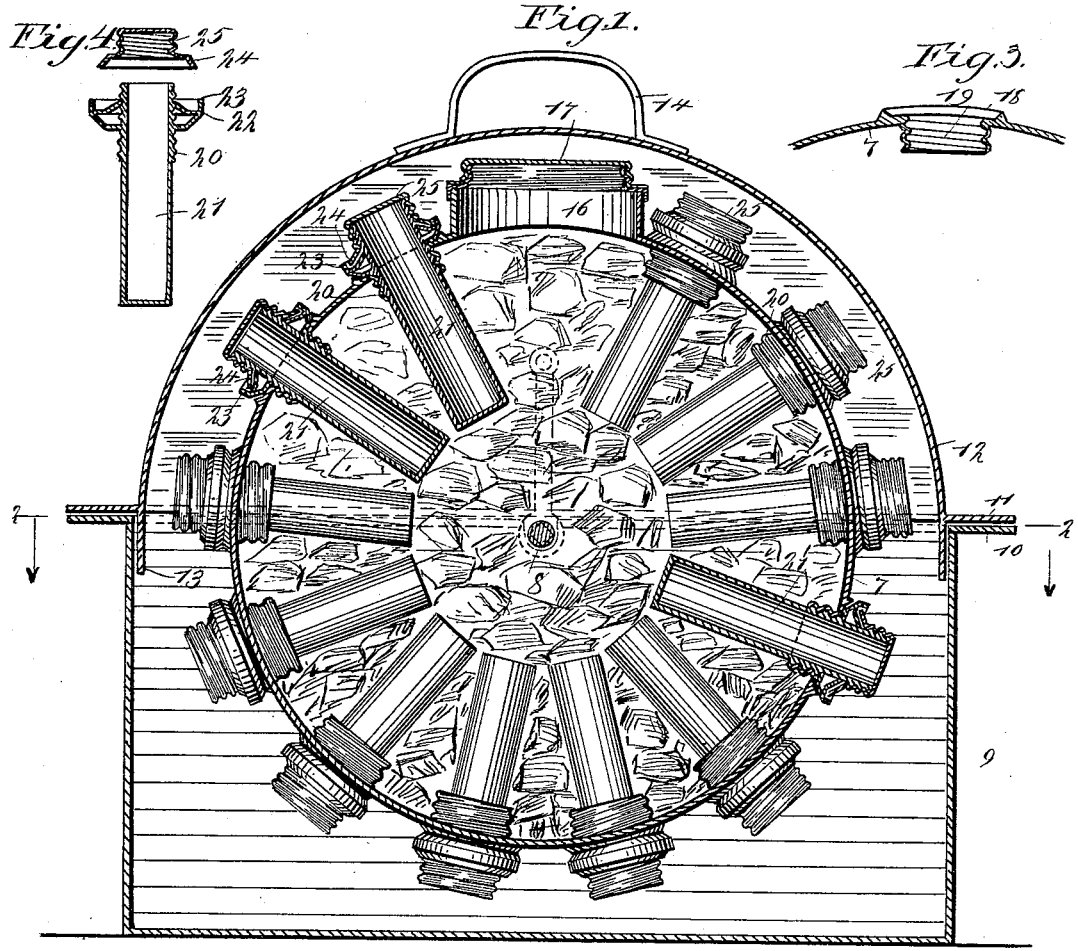
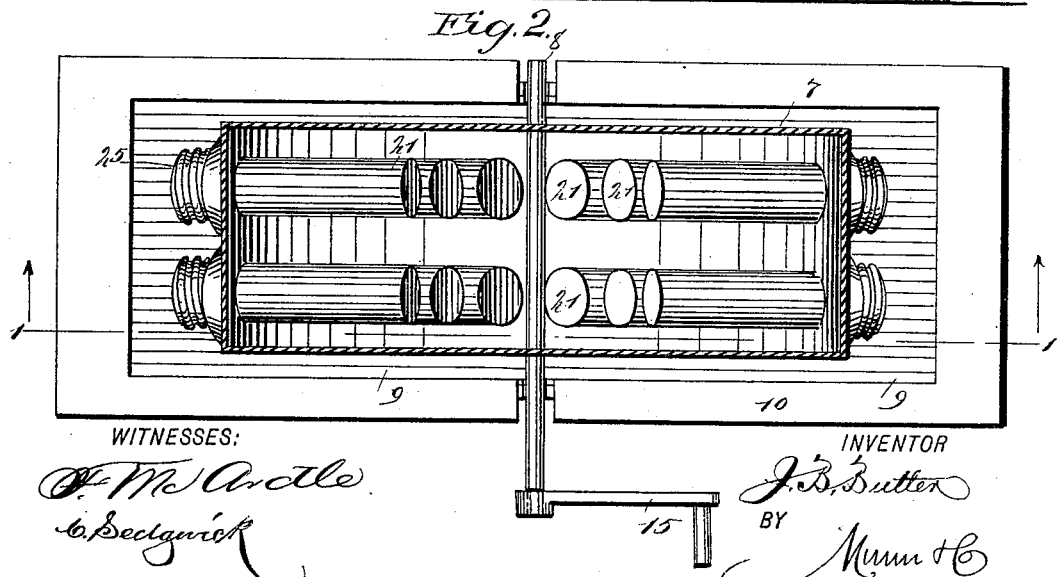
WITNESSES:
F. McArdle
C. Sedgwick
INVENTOR
J. B. Butler
BY
Munn & Co.
ATTORNEYS.

UNITED STATES PATENT OFFICE.

JOSEPH B. BUTLER, OF BROOKLYN, NEW YORK.

ICE-CREAM FREEZER.

SPECIFICATION forming part of Letters Patent No. 521,013, dated June 5, 1894.

Application filed September 23, 1893. Serial No. 486,303. (No model.)

*To all whom it may concern:*

Be it known that I, JOSEPH B. BUTLER, of the city of Brooklyn, county of Kings, and State of New York, have invented a new and Improved Ice-Cream Freezer, of which the following is a full, clear, and exact description.

My invention relates to improvements in ice cream freezers; and the object of my invention is to produce a cheap and simple machine in which cream may be economically and rapidly frozen and which is provided with numerous compartments adapted to contain individual creams, and arranged in such a manner that different bodies of cream having dissimilar flavors may be simultaneously frozen.

A further object of my invention is to arrange the several compartments or cups in such a way that they may be readily removed, and also to provide them with covers which will hermetically seal them so that the cream cannot be accidentally injured by reason of contact with the brine or water of the freezer.

To these ends my invention consists of certain features of construction and combinations of parts, as will be hereinafter described and claimed.

Reference is to be had to the accompanying drawings forming a part of this specification, in which similar figures of reference indicate corresponding parts in all the views.

Figure 1 is a vertical section on the line 1—1 of Fig. 2, and shows the general arrangement of my improved freezer. Fig. 2 is a sectional plan on the line 2—2 of Fig. 1. Fig. 3 is an enlarged detail view of a section of the main drum, showing particularly the arrangement of one of the sockets in which a cream cup is held; and Fig. 4 is a detail longitudinal section of the cream cup with its cap separated from the body of the cup.

The machine is provided with a hollow cylindrical drum 7, which is mounted on a revolving shaft 8 and is arranged to turn in a box or case 9, this box having preferably a top flange 10 on which the flange 11 of a cover 12 may rest, and the cover projects downward into the box so as to make a close joint, as shown at 13 in Fig. 1, and is provided with a handle 14.

The machine may be worked without the case and cover, but the case and cover are preferably used so as to prevent anything from coming in contact with the revolving drum.

The shaft 8 is provided with a revoluble crank 15 by which it may be turned, but instead of the crank a pulley may be employed if preferred. The drum is provided with a suitable mouth or nozzle 16 to enable it to be conveniently filled with chopped ice and salt and to be easily emptied, this mouth being closed by a screw cap 17, as shown clearly in Fig. 1.

The drum 7 is provided with a series of circumferential holes 18, the drawings showing two rows of these, although a greater or less number may be provided, and at the points where the holes occur are threaded annular flanges 19 which project into the drum a short distance and forms sockets into which the threaded portions 20 of the cream cups 21 fit. These cream cups 21 are each adapted to hold a quantity of cream suitable to serve an individual, although they may be made of any desired size. The cups 21 are each provided near the top with a projecting annular flange 22, having a turned up edge 23 within which fits the depending flange 24 of the screw cap 25 which serves as a cover for the cup, and when the cap is screwed firmly upon the cup, the flange 24 is pressed downward within the flange 23 and a perfectly tight joint is effected. When the cup 21 is screwed into the socket or flange 19, the flange 22 fits closely in the upper edge of the socket which is raised slightly, as shown in Fig. 3, and as the flange 22 is beveled slightly on the under side it fits the socket so snugly that no brine can escape from the drum. This is an important feature, as when the drum is revolved the centrifugal force throws the brine within it against the outer walls with considerable force. It will be readily understood that by providing a sufficient number of these removable cups 21 a great many flavors of cream may be conveniently frozen at one operation, and when the freezer is in motion the revolution of the drum has a tendency to turn the cream sufficiently to have it smoothly frozen.

Having thus described my invention, I claim as new and desire to secure by Letters Patent—

1. In an ice cream freezer, the combination with the revoluble drum having the screw sockets with raised outer edges, of the removable cream cups adapted to be screwed into the sockets and provided with flanges to fit the raised edges of the sockets, substantially as described.

2. In an ice cream freezer, the combination with the cream cup having a projecting annular flange with a turned up edge, of a screw cap for the cup, the cap having a depending flange to fit within the flange of the cup, substantially as described.

3. An ice cream freezer, comprising a revoluble drum provided with a series of threaded sockets having raised outer edges, a plurality of cream cups provided with projecting annular flanges having turned up edges and with threaded portions above and below the flanges, and screw threaded covers for the cups having depending flanges fitting in the flanges of the cups, substantially as herein shown and described.

JOSEPH B. BUTLER.

Witnesses:
JOHN KATTERHON,
M. SCHEER.